United States Patent
Takeuchi

[11] Patent Number: 5,903,134
[45] Date of Patent: May 11, 1999

[54] INDUCTIVE BATTERY CHARGER

[75] Inventor: Yasuo Takeuchi, Tokyo, Japan

[73] Assignee: Nippon Electric Industry Co., Ltd., Tokyo, Japan

[21] Appl. No.: 09/081,125

[22] Filed: May 19, 1998

[30]   Foreign Application Priority Data

Mar. 30, 1998  [JP]  Japan .................................. 10-103942

[51] Int. Cl.$^6$ ...................................................... H02J 7/00
[52] U.S. Cl. ........................................... 320/108; 320/109
[58] Field of Search ..................................... 320/107, 108, 320/109; 335/281

[56]            References Cited

U.S. PATENT DOCUMENTS 5,434,493  7/1995  Woody et al. ............................ 320/108

OTHER PUBLICATIONS

Electric Vehicle Inductive Charge Coupling Recommended Practice, Society of Automotive Engineers, Inc. (SAE), J1773, Issued 1995.

*Primary Examiner*—Robert E. Nappi
*Assistant Examiner*—K. Shin
*Attorney, Agent, or Firm*—Jordan and Hamburg LLP

[57]             ABSTRACT

The present invention can be implemented in various forms. One of them is disclosed in which a secondary core of a secondary-side charge port to be provided at an electric vehicle side and into which a primary magnetic coupler provided at the battery charger is to be inserted, has the general shape of L, for example, at no sacrifice of the charging output (capability).

6 Claims, 8 Drawing Sheets

INDUCTIVE BATTERY CHARGER

BACKGROUND OF THE INVENTION

1. Field of the Invention

The present invention relates to a inductive battery charger for inductive charging of a battery used on board in an electric vehicle.

2. Description of Related Art

As typically shown in FIG. 1, a inductive batter charger for an electric vehicle is provided with a magnetic coupler (primary side) 100 electrically connected to a converter and inverter (both not illustrated). On the other hand, the electric vehicle has provided inside a charge port 102 thereof a charge core 101 (secondary side) having a secondary coil 101A which is to be electrically connected to a battery (not illustrated) trough the converter and inverter. An electromagnetic induction with the secondary coil 101A of the primary-side magnetic coupler 100 induces a current in the secondary coil 101A to charge the battery on the electric vehicle.

However, the ordinary charge core (secondary side) 101 in the conventional inductive battery charger has the general shape of a simple rectangle or square as shown in FIG. 2, for example. It is thus unavoidable that a reduction of the width of the charge port 102 will result in a reduction of the sectional areas (S1+S2) of connections 103 (shown with hatching in FIG. 1) which link upper and lower members of the charge core 101. Therefore, the charging output (capability) will decrease correspondingly

SUMMARY OF THE PRESENT INVENTION

Accordingly, the present invention has an object to overcome the above-mentioned drawbacks of the prior art by providing a inductive battery charger of which a secondary-side charge port can be reduced in width and thickness at no sacrifice of the charging output (cap ability).

The above object can be accomplished by providing a inductive battery charger for inductive charging of a battery used on board in an electric vehicle, in which a secondary core to be provided at the vehicle side and into which a primary magnetic coupler provided at the battery charger is to be inserted, has the general shape of V as set forth in Claim 1.

The above object can also be accomplished by providing a inductive battery charger for inductive charging of a battery used on board in an electric vehicle, in which a secondary core to be provided at the vehicle side and into which a primary magnetic coupler provided at the battery charger is to be inserted, has the general sectional shape of C as set forth in Claim 2.

The above object can also be accomplished by providing a inductive battery charger as set forth in Claim 2, in which the secondary core having a shape of a cantilever of which an upper member and/or a lower member have a generally sector like shape as set forth in Claim 3.

The above object can also be accomplished by providing a inductive battery charger as set forth in Claim 2, in which the secondary core having a shape of a cantilever of which an upper member and/or a lower member have a generally triangular shape as set forth in Claim 4.

The above object can also be accomplished by providing a inductive battery charger as set forth in Claim 2, in which the secondary core having a shape of a cantilever of which an upper member and/or a lower member have a generally polygonal shape as set forth in Claim 5.

The above object can also be accomplished by providing a inductive battery charger as set forth in Claim 1 or 2, in which a disc-like core projection is provided only on one of upper and lower inner was of an insertion space forming a slot formed in the secondary core and in which the primary-side magnetic coupler is to be inserted, and a secondary coil is fixed only on the inner wall on which the core projection is provided, as set forth in Claim 6.

BRIEF DESCRIPTION OF THE DRAWINGS

These objects and other objects, features, aspects and advantages of the present invention will become more apparent from the following detailed description of the present invention when taken in conjunction with the accompanying drawings, of which.

DETAILED DESCRIPTION OF THE PREFERRED EMBODIMENTS

Figure 3:
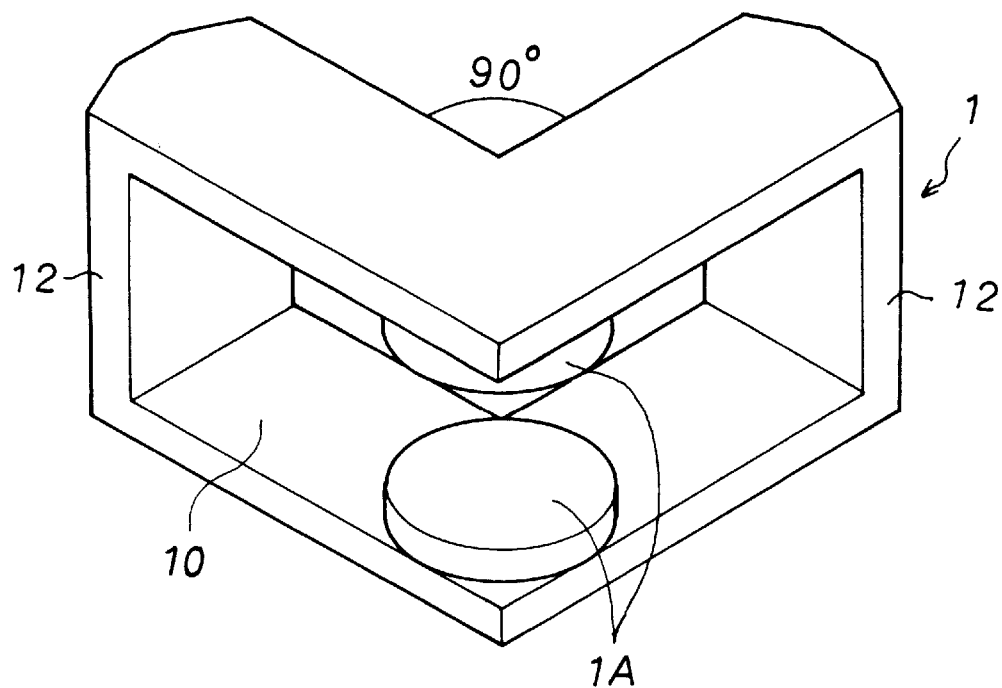
FIG. 3 is a perspective view of a first embodiment of the inductive battery charger according to the present invention, showing essential parts, especially, the secondary core, thereof.
Figure 4:
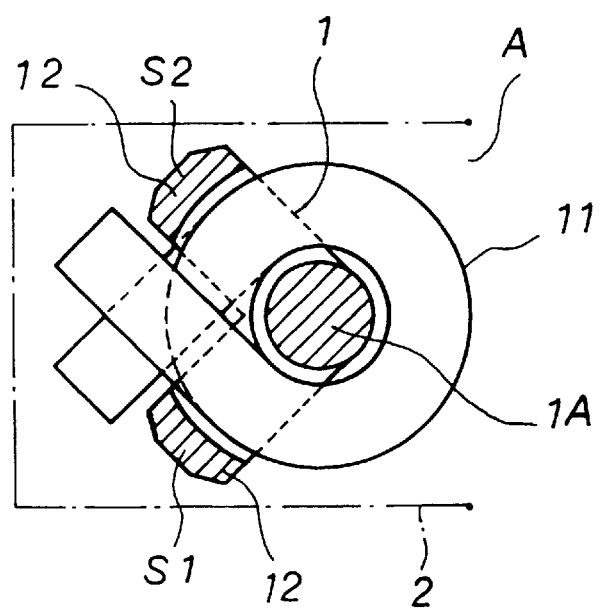
FIG. 4 is an explanatory drawing showing the secondary coil in the charge port in the first embodiment.

FIG. 3 shows essential portions, especially, a secondary side core (will be referred to as "secondary core" hereinafter) 1, of the first embodiment of the inductive battery charger according to the present invention. The secondary core 1 (to be provided at an electric vehicle side) has the general contour of V As shown in FIG. 4, the secondary core 1 is disposed in a charge port 2 open at A (insertion opening) toward outside the vehicle body (which is normally closed with a cover or the like when no battery charging is done).

Figure 5:
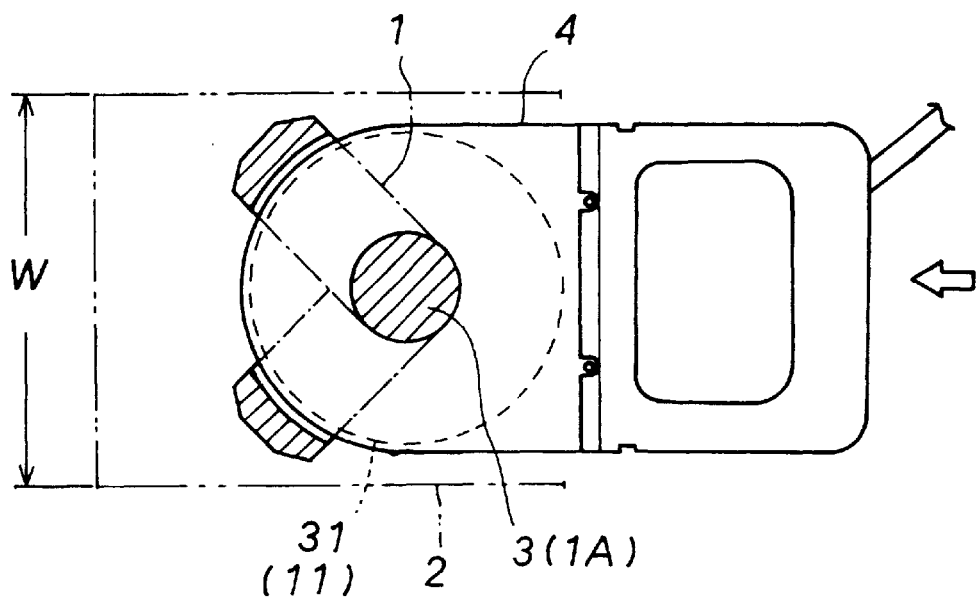
FIG. 5 is an explanatory drawing showing the magnetic coupler inserted in the charge port of the inductive battery charger in FIG. 4.

As shown in FIG. 5, the primary-side charger has a thin tongue-shaped coupler 4 having a similar shape to that of the conventional coupler. The coupler 4 has provided therein a primary-side core (will be referred to as "primary core" hereinafter) 3 and a primary-side coil (will be referred to as "primary coil" hereinafter) 31 provided around the core 3 and having a same outside diameter as that of the conventional primary coil.

The secondary core 1 is designed so that vertical connections 12 (shown with hatching at upper and lower left of FIG. 4) linking upper and lower members of the secondary core 1 have same sectional areas, namely, sectional areas (S1+S2), as those of the conventional connections. As shown in FIG. 4, the secondary core 1 has a secondary-side coil (will be referred to as "secondary coil" hereinafter) 11 having a several turns. The secondary coil 11 is connected to the battery used on board in an electric vehicle (not shown). As shown in FIG. 3, disc-shaped core projections 1A are formed at the central corners of the top and bottom walls of an insertion space 10 of the secondary core 1 (slot into which the coupler 4 is to be inserted).

The charge port 2 is reduced in outside dimensions, especially width W, correspondingly to the V-shaped design of the secondary core 1 (in this embodiment, the bent angle of the secondary core 1 is 90 deg. but this bent angle may be smaller or larger than 90 deg.) as shown in FIG. 5. However, the charge port 2 has a sufficient space for accommodation of the secondary and primary coils 11 and 31.

Therefore, since the connections 12 in this embodiment have a same sectional area as that of the conventional connections, so that the width of the charge port 2 can be considerably reduced with the charging output (capability) not reduced correspondingly, which is advantageous for use of the battery charger in a car of which the inner space is narrow and limited for installation of the battery charger.

Next, the second embodiment of the present invention will be described below.

Figure 1:
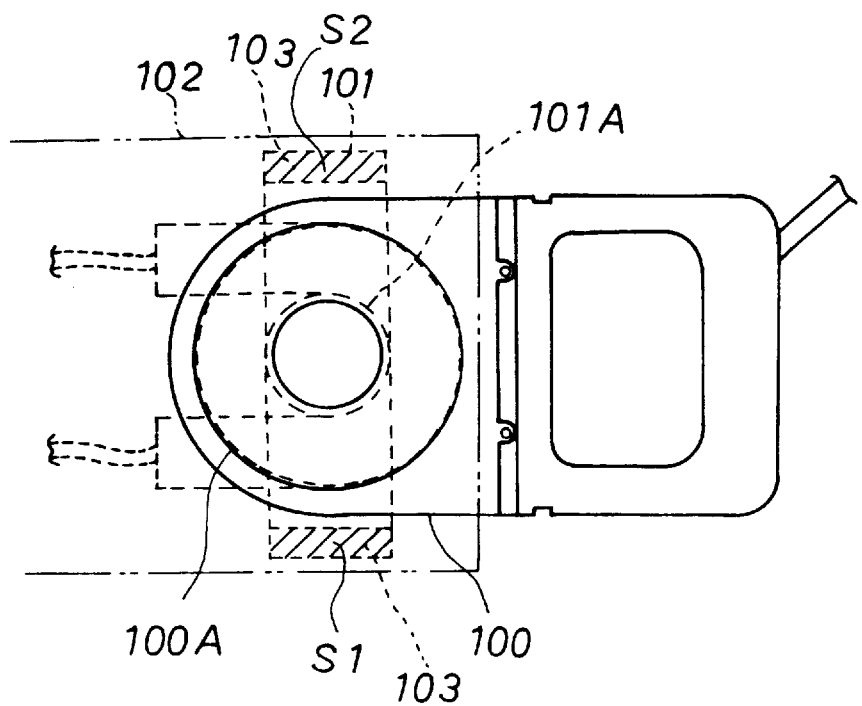
FIG. 1 is an explanatory drawing of a conventional inductive battery charger.
Figure 2:
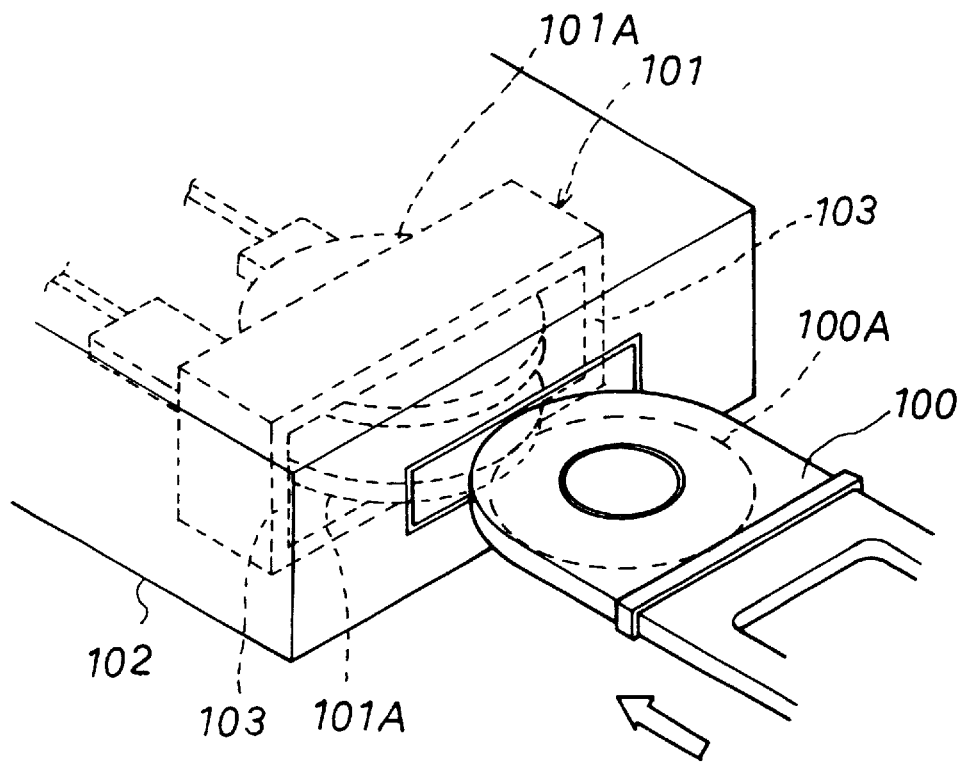
FIG. 2 is a perspective view of the inductive battery charger in FIG. 1.
Figure 6:
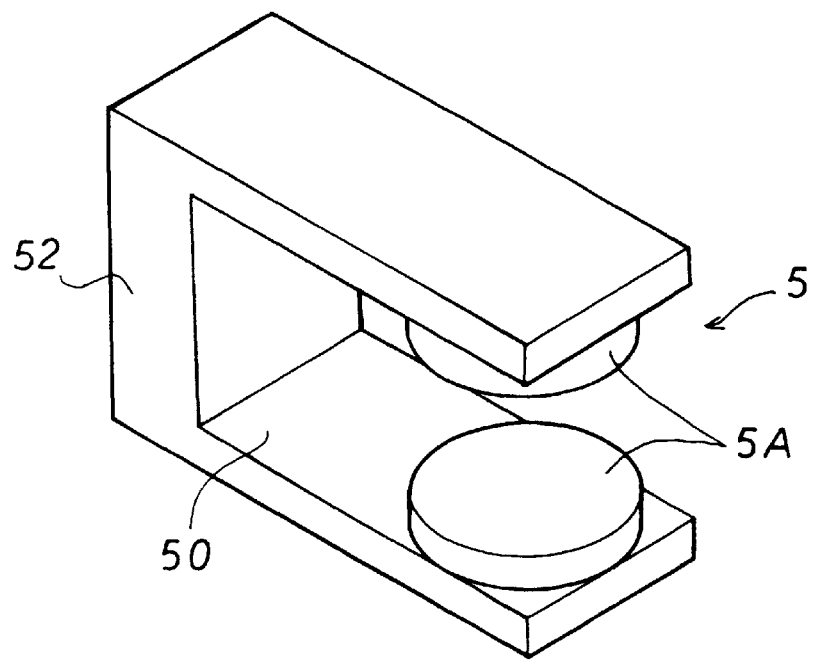
FIG. 6 is a perspective view showing the secondary core in a second embodiment of the inductive battery charger according to the present invention.
Figure 7:
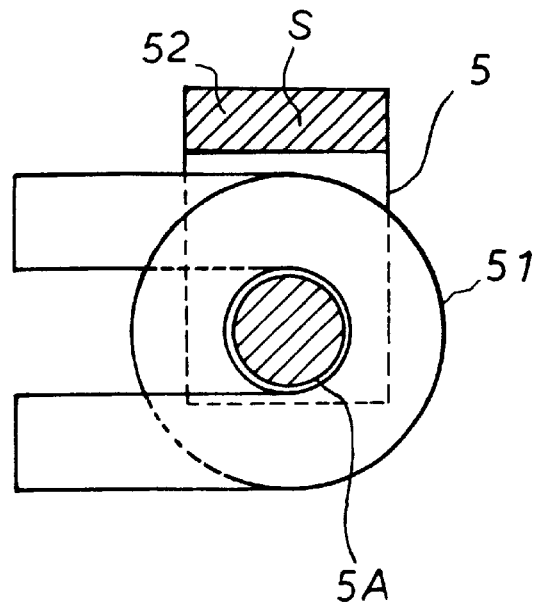
FIG. 7 is a view showing the construction of the secondary coil in the second embodiment.
Figure 8:
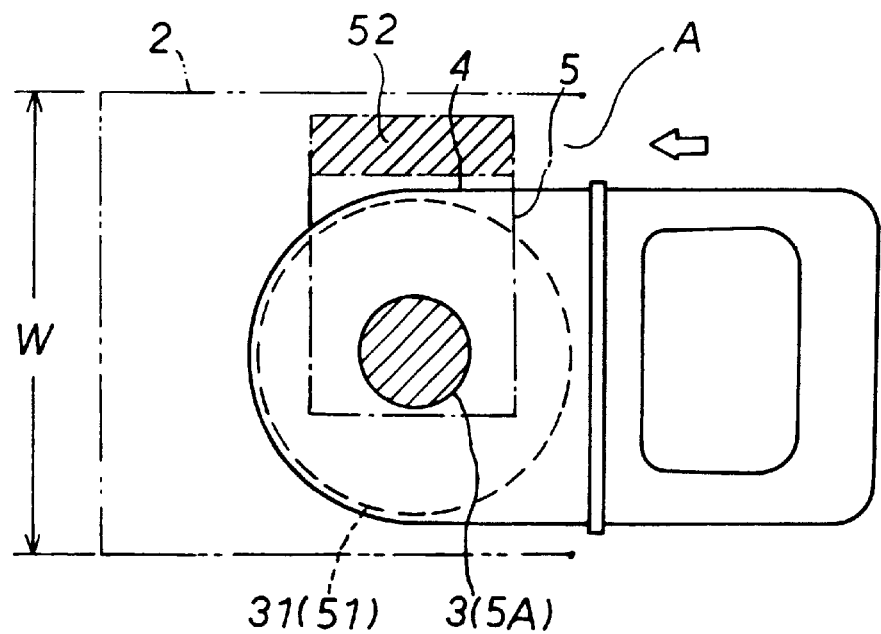
FIG. 8 is an explanatory drawing showing the magnetic coupler inserted in the charge port in the second embodiment of the inductive battery charger.
Figure 9:
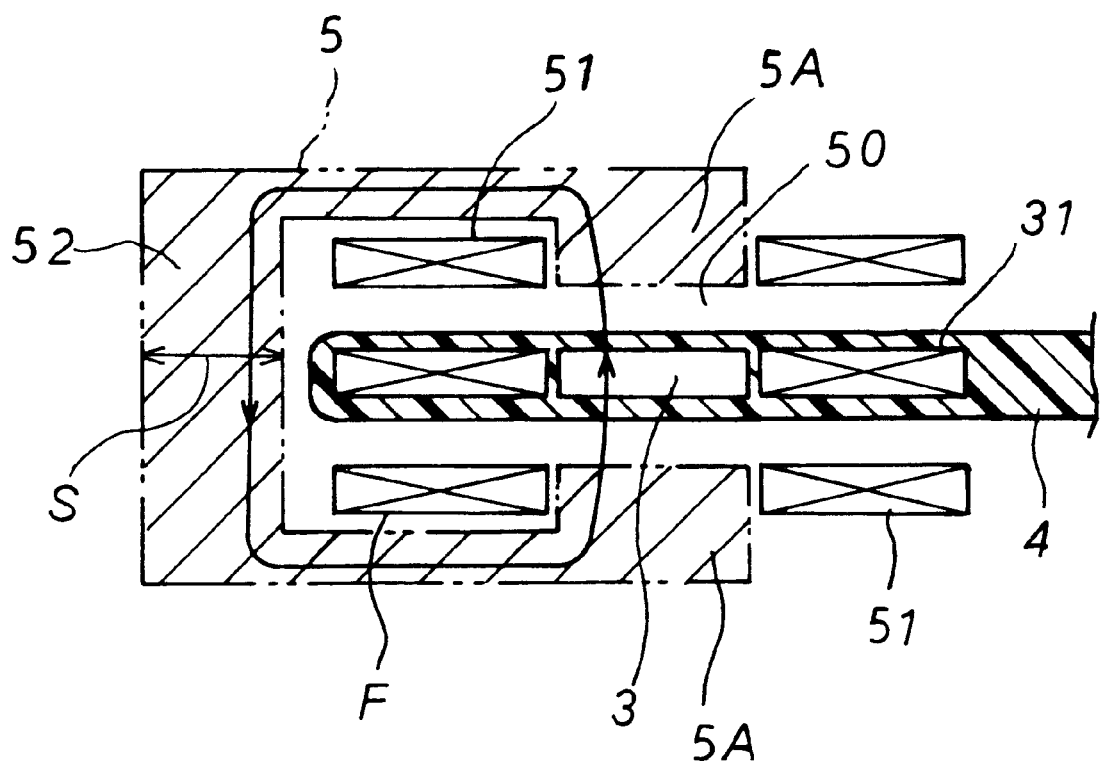
FIG. 9 is a sectional view of the magnetic coupler inserted in the charge port in the second embodiment of the inductive battery charger.

As shown in FIGS. 6 and 7, the secondary core 5 is of a cantilever-type design having a generally C-like sectional shape (rectangular or square when viewed from above) and a secondary coil 51 having a same diameter as that of the conventional secondary coil is provided with a part thereof exposed to outside the secondary core 5. As shown in FIG. 8, this embodiment uses a coupler 4 having a same size as that of the conventional coupler as shown in FIG. 1. The coupler 4 is to be inserted into an insertion space 50 (shown in FIGS. 6 and 9). The coupler 4 has provided therein a primary coil 31 having a same diameter as that of the conventional primary coil In this embodiment, the amount of magnetic flux F (as in FIG. 9) depends upon the sectional area (S) of a connection 52 shown with hatching in FIG. 7. Therefore, if the sectional area (S) of the connection 52 is equal to the sectional areas (S1+S2) of the connections 103 of the conventional secondary core (S=S1+S2), a charge port 2 of a smaller width than the conventional charge port but keeping the conventional charging output (capability), can be provided according to the present invention.

The third embodiment of the present invention will be described below.

Figure 10:
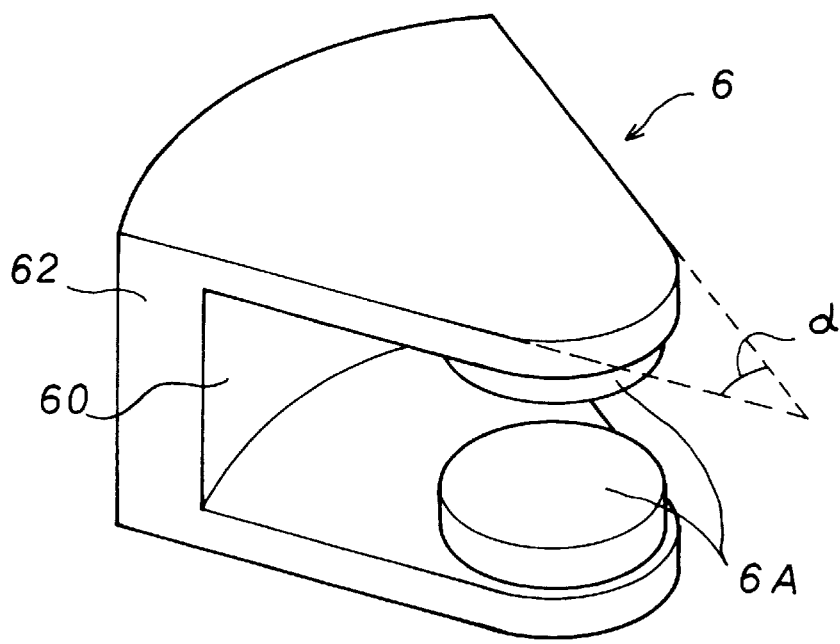
FIG. 10 is a perspective view showing the secondary core in a third embodiment of the inductive battery charger according to the present invention.
Figure 11:
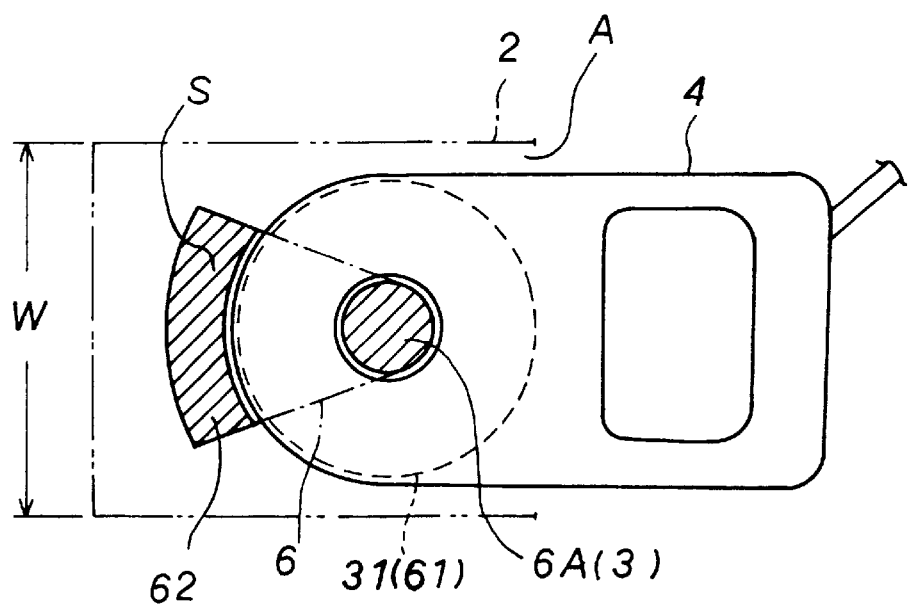
FIG. 11 is an explanatory drawing showing the magnetic coupler inserted in the charge port in the third embodiment of the inductive battery charger.

As shown in FIG. 10, the third embodiment also uses a secondary core 6 of a cantilever-type design. In this embodiment, however, the secondary core 6 has the general shape of a sector (having a central angle a) and has a disc-shaped core projection 6A formed on each of the upper and lower members thereof which form together an insertion space 60. As shown in FIG. 11, a secondary coil 61 is provided around the core projections 6A between the upper and lower members of the secondary core 6. It should be noted that the cantilever-shaped secondary core may be designed to have any suitable one of polygonal shapes such as triangular, trapezoidal, pentagonal, hexagonal or the similar shapes (geometrical shapes) when viewed from above, other than the sector shape.

Therefore, also in this embodiment, the charge port 2 may be designed to have a width W somewhat larger than the diameter of the secondary coil 31. In this case, if the sectional area (S) of the connection 62 of the secondary core 6 is equal to the sectional areas (S1+S2) of the conventional connections, a charge port 2 of a smaller width than the conventional charge port but keeping the conventional charging output (capability), can be provided according to the present invention.

Next, the fourth embodiment of the present invention will be described below.

Figure 12:
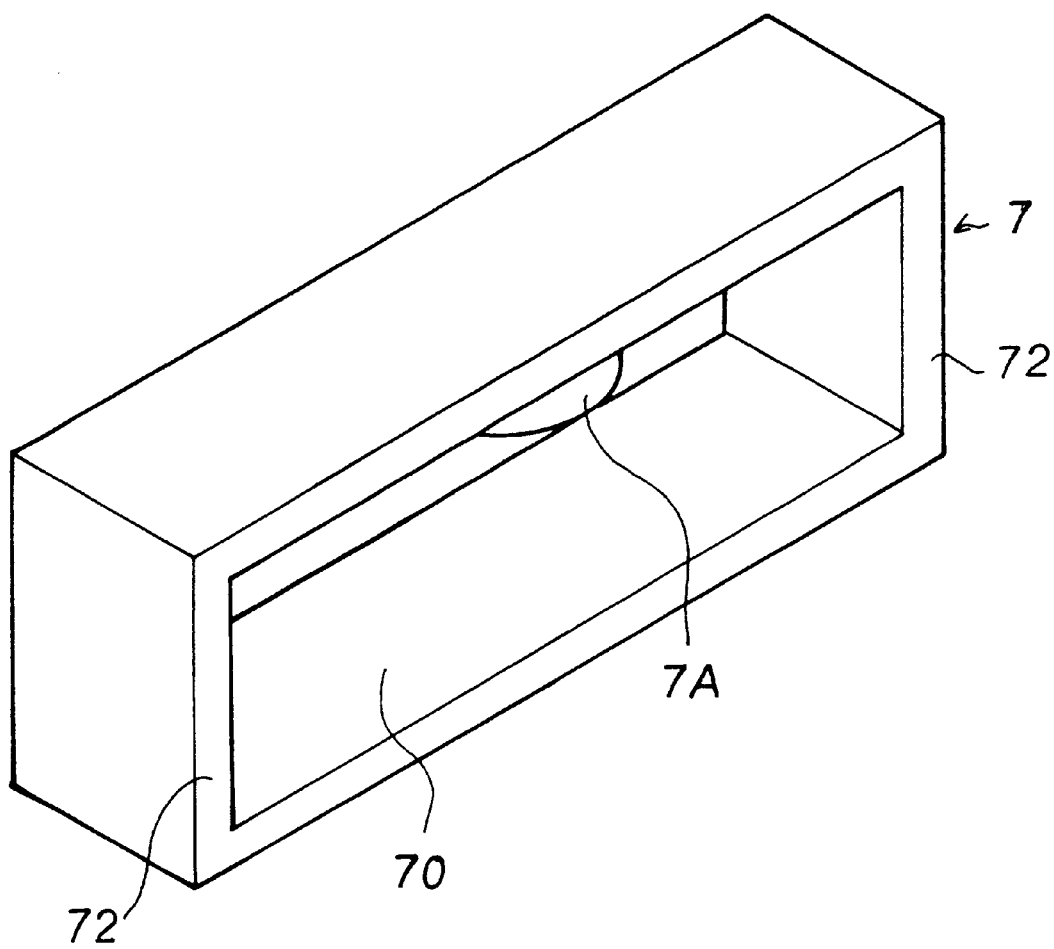
FIG. 12 is a perspective view showing the secondary core in a fourth embodiment of the inductive battery charger according to the present invention.

As shown in FIG. 12, the fourth embodiment uses a secondary core 7 having the general shape of a rectangle. A disc-shaped core projection 7A is disposed only at the upper central portion of the inner wall of an insertion space 70 (near the ceiling or upper member of the secondary core 7 in this embodiment, but it may be disposed on the floor or lower member). Different from those in the first to third embodiments, the secondary core 7 has on one secondary coil provided on the inner wall (ceiling in this embodiment) on which the core projection 7A is also formed. It should be noted that the first to third embodiments may have only one core projection at the secondary side and only one secondary coil correspondingly.

Figure 13:
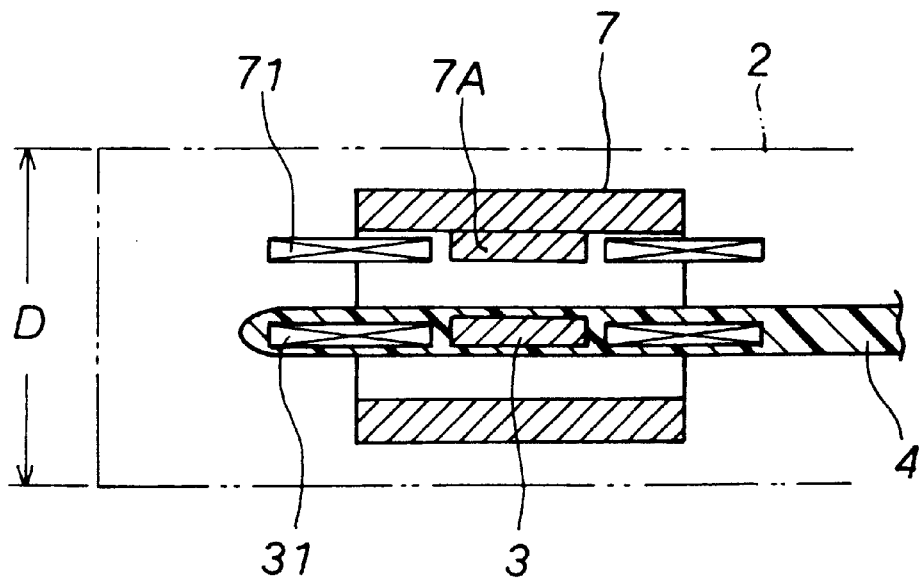
FIG. 13 is a sectional view of the magnetic coupler inserted in the charge port in the fourth embodiment of the inductive battery charger.

Therefore, since only one secondary coil is provided in this embodiment as shown in FIG. 13, the thickness D of the charge port 2 can be reduced correspondingly.

Figure 14:
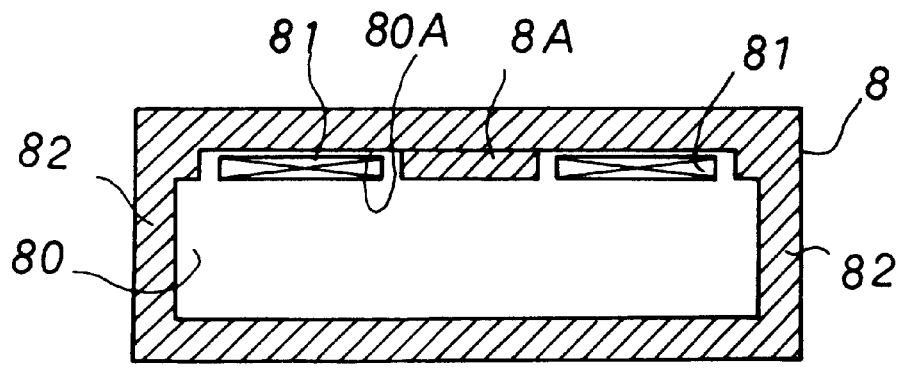
FIG. 14 is a schematic sectional view of a variant of the fourth embodiment.

FIG. 14 shows a variant of the fourth embodiment. As shown, a concavity 80A is formed in the inner wall (ceiling or upper member in this embodiment, but it may be the floor or lower member) of an insertion space 80 of a secondary core 8. A core projection 8A and secondary coil 81 are provided in this concavity 80A as seen from FIG. 14. This design of the secondary core 8 enables to more reduce the thickness of the charge port 2. Even in the embodiments shown in FIGS. 13 and 14, same sectional areas of the secondary coil connections 82 as that of the conventional secondary coil connections permit to maintain a same charging output (capability) as in the conventional inductive battery charger.

In the first to fourth embodiments having been described in the foregoing, forming concavities in both the upper and lower members of the secondary core or insertion space, in which the core projection and secondary coil are to be accommodated, will allow the secondary core to have a reduced thickness as in the above.

In these embodiments, the upper and lower members of the secondary core are identical in shape and size to each other, but they may have different shapes and sizes. Many variations are possible. For example, the upper member of the secondary core may have a rectangular shape while the lower member may have a sector shape.

As having been described in the foregoing, according to the present invention, the core of the charge port (at the vehicle side) into which the primary-side coupler (battery charger side) is to be inserted is designed to have a bent, curved, cantilever (for example, a half of the conventional one), circular, sector, polygonal or similar shape. The width of the secondary core, and thus the width and thickness of the charge port, can be reduced. Keeping a same sectional area of the connection of the secondary core as that of the conventional connections assures to provide a same charging output (capability) as in the conventional inductive battery charger Therefore, the present invention is very effectively usable for electric vehicles of which the inner space is narrow and so limited for installation of a battery charger.

What is claimed is:

1. An inductive battery charger for inductive charging of a battery used on board in an electric vehicle, wherein a secondary core to be provided at the vehicle side and into which a primary magnetic coupler provided at the battery charger is to be inserted, has the general shape of V.

2. An inductive battery charger for inductive charging of a battery used on board in an electric vehicle, wherein a secondary core to be provided at the vehicle side and into which a primary magnetic coupler provided at the battery charger is to be inserted, has the general sectional shape of C.

3. The inductive battery charger as set forth in claim 2, wherein the secondary core having a shape of a cantilever of which an upper member and/or a lower member have a generally sector-like shape.

4. The inductive battery charger as set forth in claim 2, wherein the secondary core having a shape of a cantilever of which an upper member and/or a lower member have a generally triangular shape.

5. The inductive battery charger as set forth in claim 2, wherein the secondary core having a shape of a cantilever of which an upper member and/or a lower member have a generally polygonal shape.

6. The inductive battery charger as set forth in claim 1 or 2, wherein a disc-like core projection is provided only on one of upper and lower inner walls of an insertion space forming a slot formed in the secondary core and in which the primary-side magnetic coupler is to be inserted, and a secondary coil is fixed only on the inner wall on which the core projection is provided.

* * * * *